United States Patent [19]

Moorhouse

[11] Patent Number: 5,552,587
[45] Date of Patent: Sep. 3, 1996

[54] MULTI-LIGHT CODED ELECTRONIC SECURITY LOCK

[76] Inventor: John H. Moorhouse, P.O. Box 236, Clear Lake, Minn. 55319

[21] Appl. No.: 278,243

[22] Filed: Jul. 21, 1994

[51] Int. Cl.⁶ ...................................... G06K 5/00
[52] U.S. Cl. .............. 235/382; 70/366; 70/277; 70/DIG. 51; 340/825.31
[58] Field of Search .................. 235/382, 382.5; 70/D51, 366, 277, 278; 340/825.31

[56] References Cited

U.S. PATENT DOCUMENTS

| | | | |
|---|---|---|---|
| 2,008,150 | 7/1935 | Nelson | 70/277 |
| 3,889,501 | 6/1975 | Fort | 70/D51 X |
| 4,090,175 | 5/1978 | Hart | 70/D51 X |
| 4,322,719 | 3/1982 | Moorhouse | 235/382 |
| 4,593,185 | 6/1986 | Patzelt et al. | 235/382 |
| 4,838,060 | 6/1989 | Hutzenlaub | 70/491 |
| 5,018,376 | 5/1991 | Lee | 70/491 |

FOREIGN PATENT DOCUMENTS

| | | |
|---|---|---|
| 1008397 | 3/1983 | U.S.S.R. |
| 2161536 | 1/1986 | United Kingdom |

*Primary Examiner*—Donald T. Hajec
*Assistant Examiner*—Michael G. Lee

[57] ABSTRACT

The invention herein is a terminal having secured access to data in a computer where such data is segregated and separately identified, access to the terminal being had by a tubular key rotating discs therein to interrupt a sustained light stream into a blinking code to be read by a counter transmitting the code read to the computer making the same operational to release and make operational the particular programs or data identified therein, all being subject to the operation of the terminal within a prescribed time span.

7 Claims, 5 Drawing Sheets

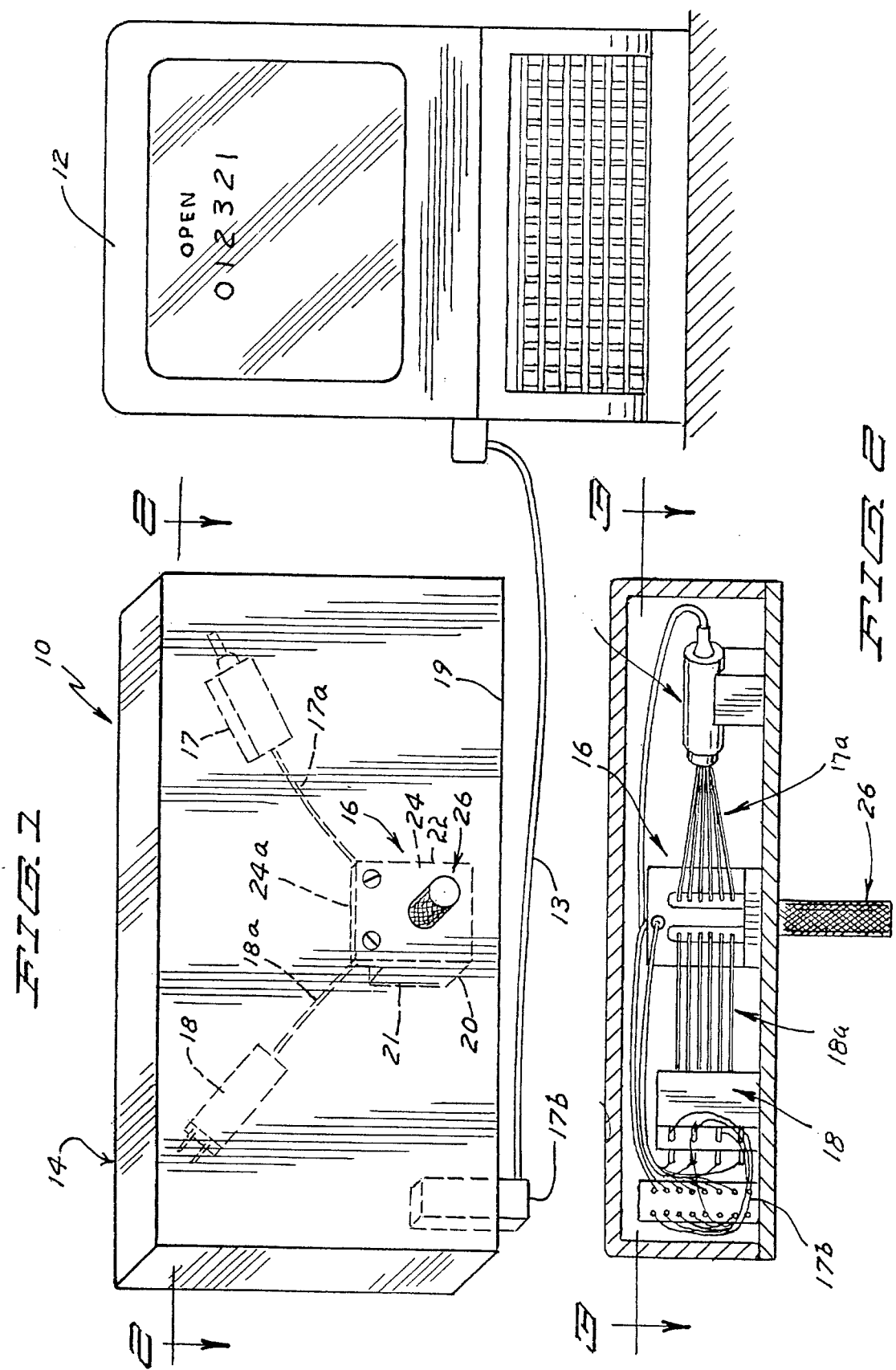

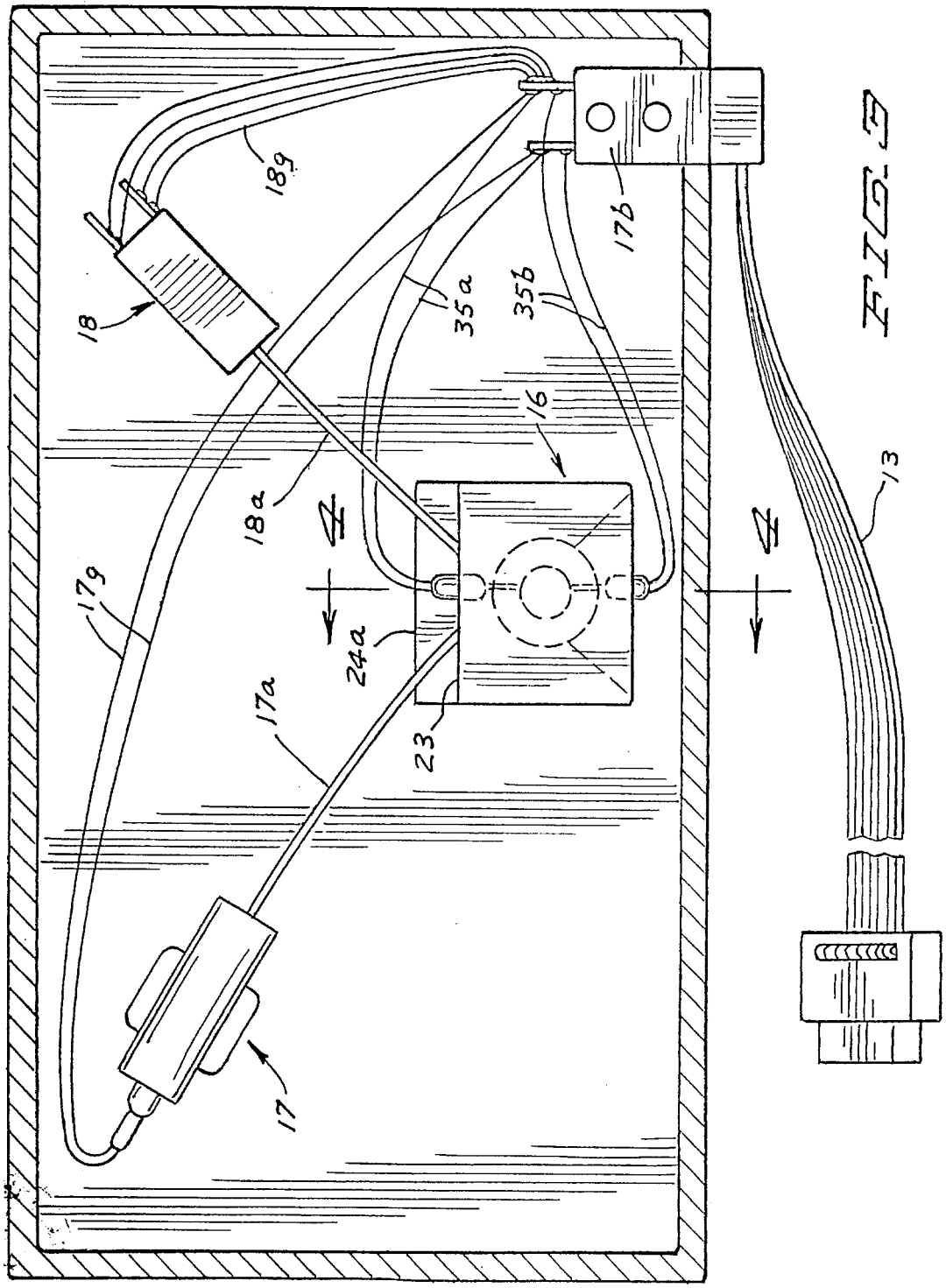

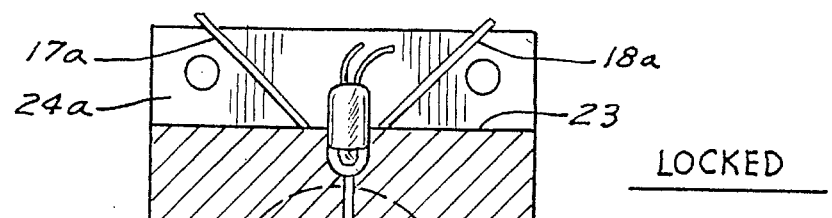
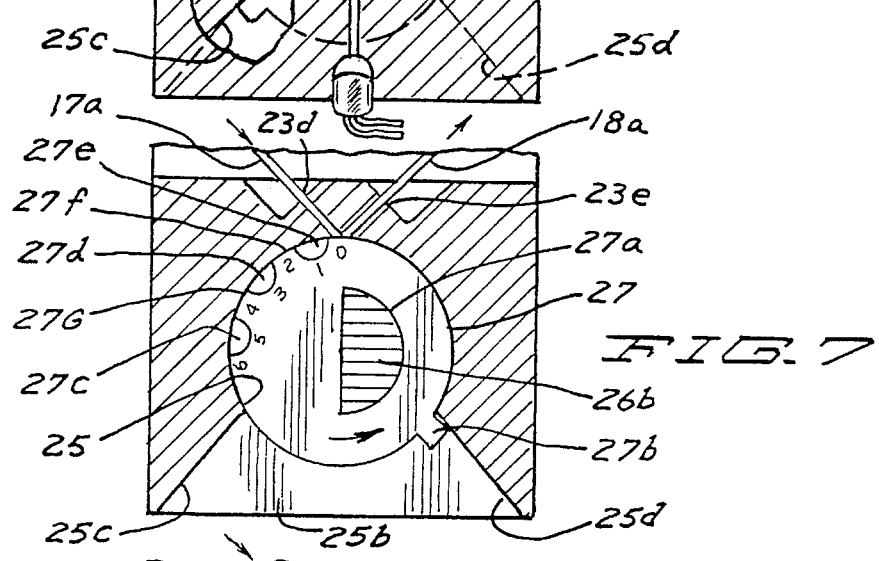
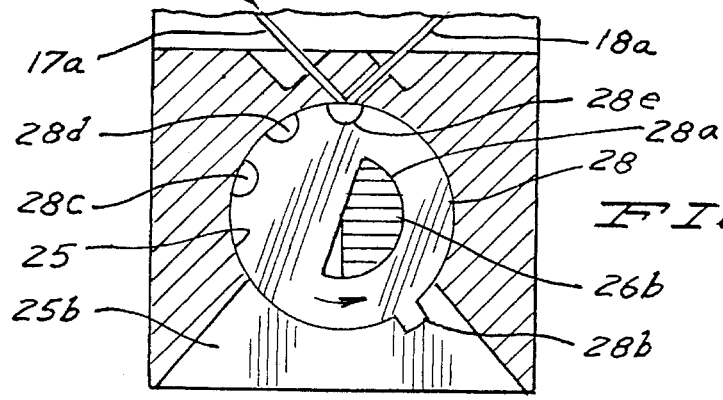
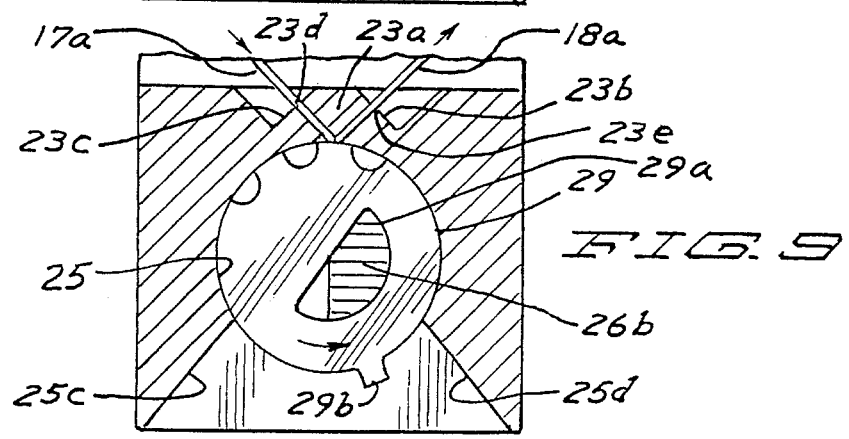

UNLOCKED

MULTI-LIGHT CODED ELECTRONIC SECURITY LOCK

BACKGROUND OF THE INVENTION

1. Field of Invention

Relates to a tubular key controlled operation of a terminal based on the coded interruption of a light stream therein as read by a counter adapted therewith to make operational a computer program in circuit therewith, the program being identified by said code as read by said counter.

2. Description of the Previous Art

There is not known presently to be any terminal providing access to secured data in a computer by a coded interruption of a light stream generated within the terminal and read by a counter having access to a program in a computer to make the same operational.

The applicant in his U.S. Pat. No. 4,322,719 disclosed a coded solid state entry device by the use of a tubular coded key engaging a plurality of switches to energize a circuit to unlatch tumblers of which a code is read which functions to match with an electronic circuit to allow access or entry.

Known also are terminals which are operated by coded plastic cards which require card reading machines which in turn are adapted to put a computer into an operational mode to perform a specified task.

SUMMARY OF THE INVENTION

The invention herein is characterized by its extensive capacity and by its simplicity.

Essentially it consists of a tubular key which rotates a plurality of discs which upon rotation cause a coded interruption of a light stream with the interruptions being read by a counter which in turn accesses a computer and more particularly it accesses identified data or a program which is otherwise secured and puts it into an operational mode.

The invention represents a simplicity in operating parts having only a plurality of rotatable discs or wheels having notched peripheries which upon rotation provide a coded interruption of a continuous light stream passing thereover which interruptions are a coded signal read by a counter which to be transmitted by said counter to a computer wherein said code will be read to make operational an intended program bearing the same code for operation.

Further the invention is also characterized by its smallness of size, the terminal housing said discs being on the order of an inch cube and its related parts of correspondingly small size.

Additionally as to its capacity, said terminal upon housing on the order of eleven discs can provide on the order of two billion code combinations and a more simplified version having a half dozen discs can provide over two thousand code combinations.

These and other objects and advantages of the invention will be set forth in the following description in connection with the accompanying drawings in which like reference characters refer to similar parts throughout the several views.

BRIEF DESCRIPTION OF THE DRAWINGS

FIG. 1 is a collective view showing a front perspective of a portion thereof with parts therein in dotted line and a front elevation is shown of a connected portion;

FIG. 2 is a view in vertical section taken on line 2—2 of FIG. 1;

FIG. 3 is a view in horizontal section taken on line 3—3 of FIG. 2 as shown;

FIG. 6 is a view in vertical longitudinal section taken on line 6—6 of FIG. 5 as shown; and FIGS. 7–12 are views in vertical section taken on their respective lines of FIG. 5 from front to back.

DESCRIPTION OF A PREFERRED EMBODIMENT

Figure 4:
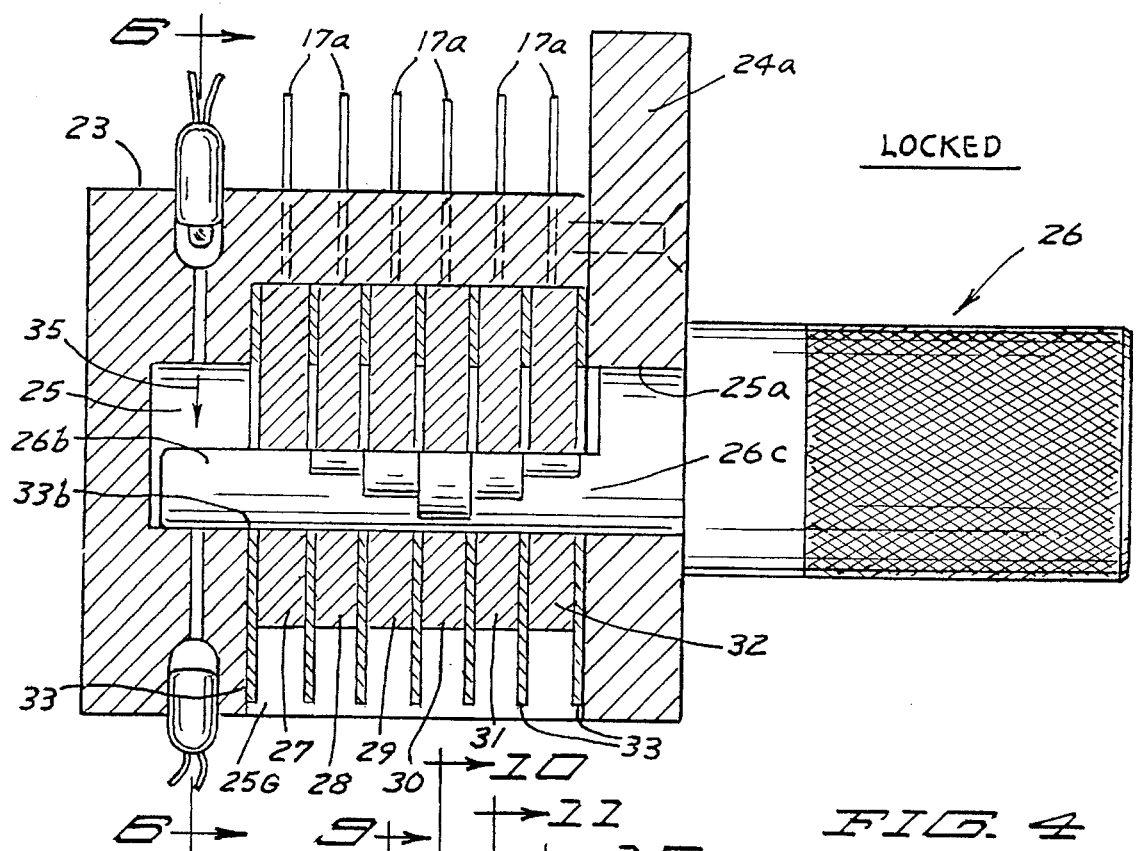
FIG. 4 is a view in vertical section taken on line 4—4 of FIG. 3 as indicated with FIG. 4 in reverse position.

Referring to the drawings and more particularly to FIGS. 1 and 2, the device comprising the invention herein and its related parts are indicated generally by the reference numeral 10. In FIG. 1, an electrical connection is indicated as being made with a computer 12 by a conduit 13.

The several parts of the device herein are disposed within a housing 14 shown to be rectangular in cross section.

Indicated within said housing and to be more specifically described are a terminal 16 having an operational association with a light source 17 and a counter 18 of conventional design which is in circuit with said computer 12. Said light source and said counter respectively have lines 17g and 18g running to a power source 17b.

Although not here shown, a wall of said housing is readily removable for access to parts therein.

Mounted upon the bottom wall 19 of said housing and secured thereto by screws not here shown is said terminal 16 which is substantially cubic in form having a bottom wall 20, side walls 21 and 22, a top 23 and a front wall 24 which extends above said top forming a ledge 24a extending thereabove.

Said terminal 16 is very nicely formed of annodized aluminum as are its various parts to be described. The very significant feature of this material is that it is neutral to and completely unaffected by any electronic or electrical influence or force field.

Figure 5:
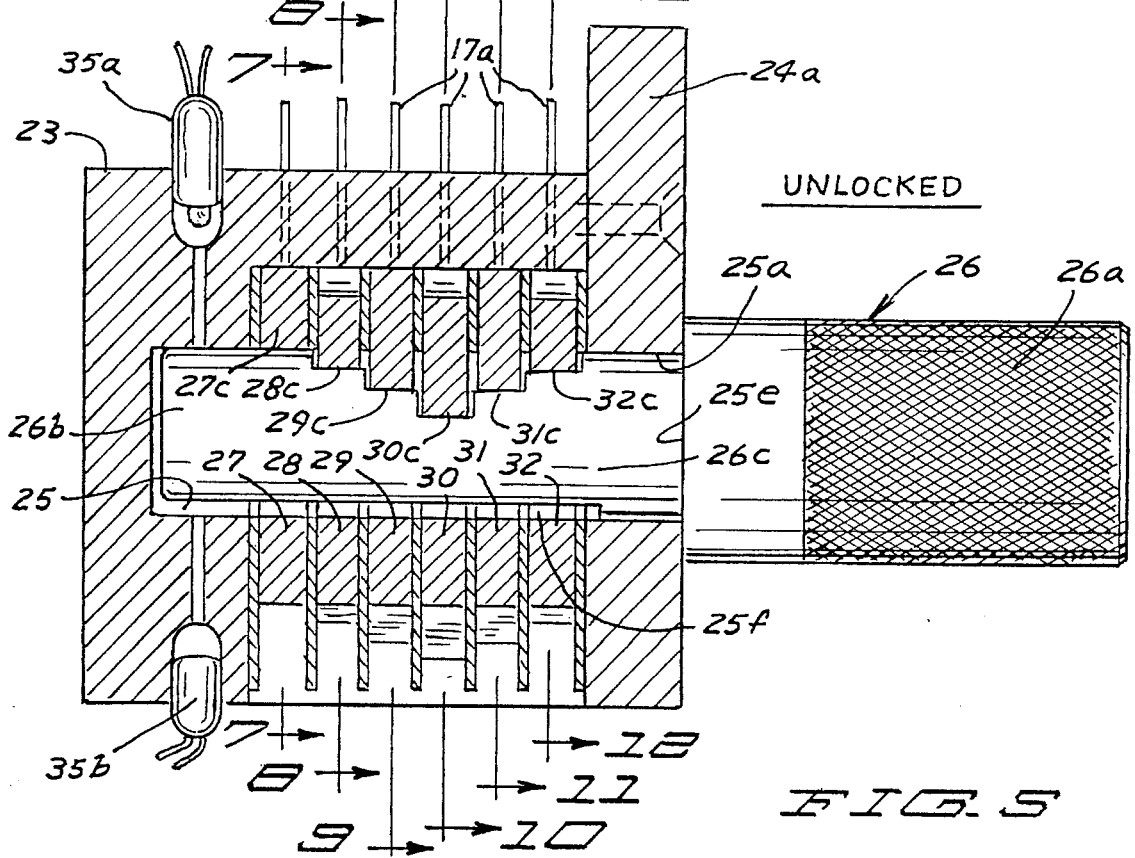
FIG. 5 is a view in vertical longitudinal section of the body portion of the device herein.
Figure 10:
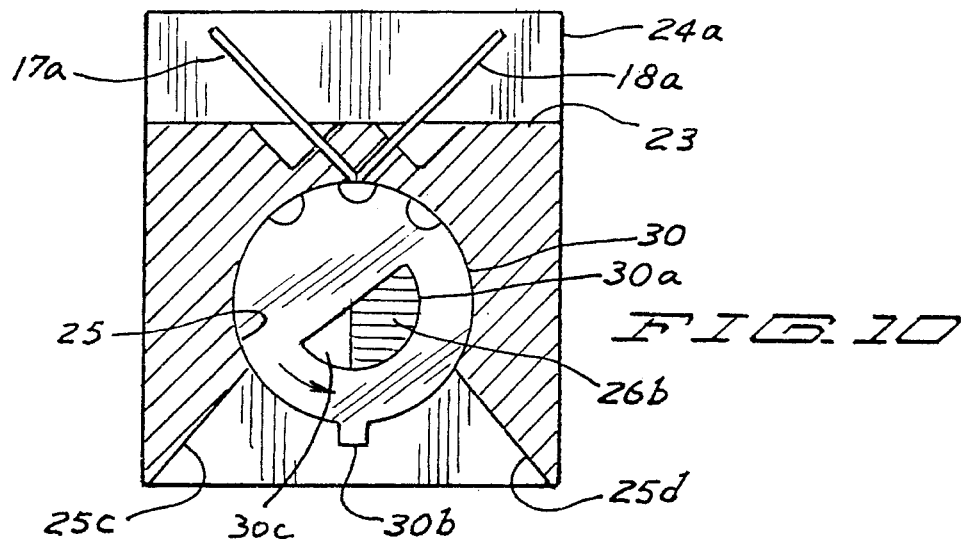
Figure 11:
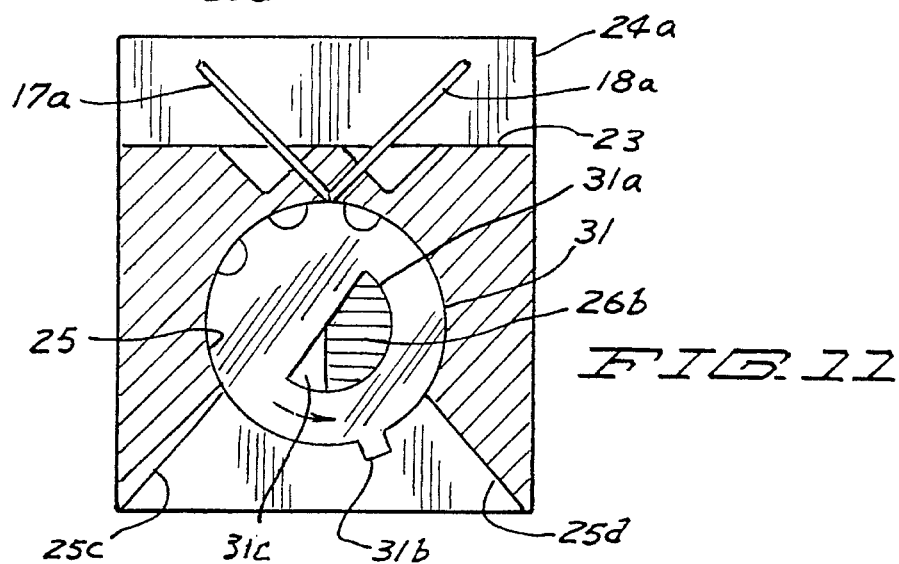
Figure 12:
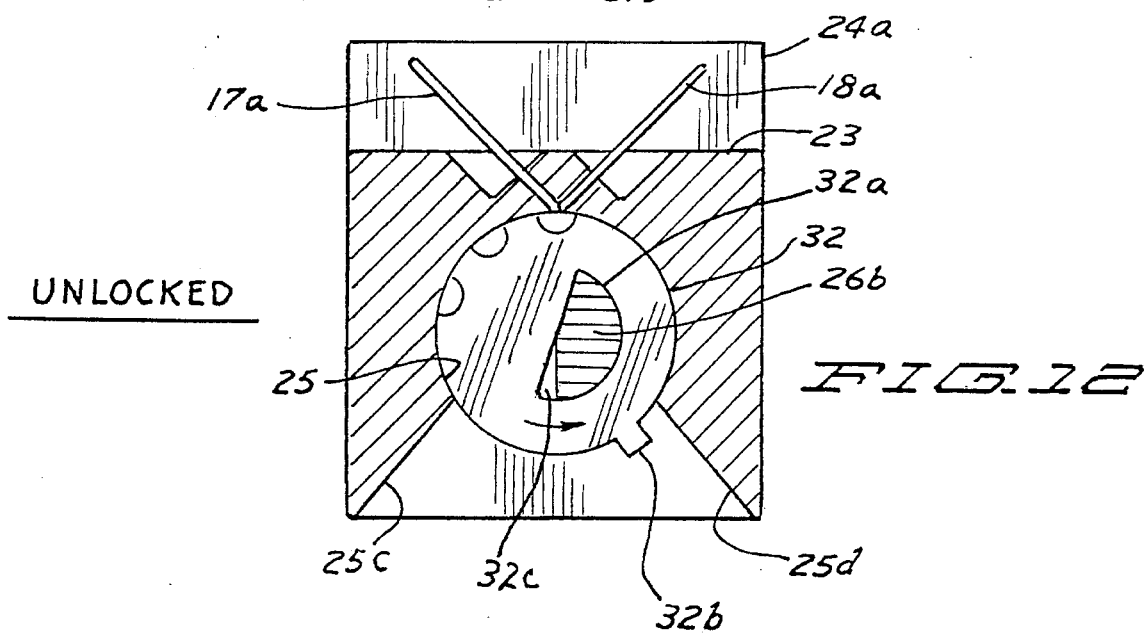

Said cubic terminal has formed therein as indicated in FIGS. 3 and 5 a substantially circular axial bore 25 which extends from behind the front wall to the extent needed and said bore has a forward extension 25a reduced in size to provide an aperture 25e through said front wall to accommodate a tubular key to be described.

Also formed underlying said bore and being coextensive therewith is a space 25b having angled side walls 25c and 25d which intersect said bore below the vertical midpoint thereof as shown in FIGS. 4–9. The purpose for this will be described.

Now with reference to FIGS. 4 and 5, disposed within said bore vertically and laterally thereof are discs or wheels 27–32 as shown in FIGS. 6–12 in vertical section and as shown in FIGS. 4 and 5 in vertical cross section and the same are circular. Disposed in said bore at the outer ends of said wheels and therebetween are spacers or washers 33 which provide friction free rotation of said wheels and which shield against the passage of light therebetween.

The wheels as presented in the present embodiment are six in number for purpose of illustration only and not for limitation. Each wheel has a peripheral projection such as 27b and as illustrated in FIG. 7. The projections engage the angled wall 25c to align the wheels in a starting position and to prevent any rotation of the wheels to the left.

Each wheel has an axial semi-circular bore such as 27a–32a and in alignment said bores receive a key 26 to be described. Each of said spacers has a central aperture 33b aligned with said wheel bores as indicated in FIG. 4. An important function of said spacers is to provide an absolute light proof separation between said wheels.

Said wheels are coded with each wheel having a segment of the code. Each wheel has a very reflective periphery, the wheels being made of a highly polished aluminum to be very reflective for which further explanation will be given. The code is formed thus. A peripheral portion of each wheel, spaced somewhat oppositely its respective peripheral projection 27b–32b has formed therein notches 27–32c, d, e and lands f and g therebetween. Said notches are non-reflective. The number of notches and lands here indicated are for purpose of illustration only.

Now, with respect to the top 23 as shown in FIGS. 6–12, there is a central vertical convex projection 23a having slanted sides 23b and 23c with each side having bores 23d and 23e respectively in alignment with said wheels 27–32.

In connection with said terminal is said light supply through a fiber optic cable 17a running from a conventional light source 17b comprising fiber optic lines having individual lines 17a running to each of said bores 23d which are in alignment with the respective bores 23e and the fiber optic lines 18a for passage of light to the counter 18 as will be further described.

Said individual fiber optic lines 18a form a cable 18a with each of the lines thereof forming a passage for transmission of light from the respective bores 23e to the corresponding contacts with the counter 18 which is characterized as a conventional type element which receives a light code message from its fiber optic lines and converts the same into corresponding electrical impulses which represent the code referred to. This is a conventional procedure and its specific operation is known in the art and does not require explanation.

The light through the fiber optic lines is constant. With particular reference to FIGS. 6–12, the light in passing through the fiber optic lines is a steady stream of light if not interrupted. The reflective surface of the periphery of the wheels 27–32 aids in the passage of light from the fiber optic lines 17a through the lines 18a.

With the rotation of the wheels 27–32 said notches and lands, as will be further described, pass through and interrupt the light stream passing from the fiber optic lines 17a through the lines 18a and thus interrupt the otherwise steady passage or streams of light at their respective bores and thus the interruptions define the code to cause the computer to become operative. Next the formation and further operation of the code will be described.

In the present embodiment, the terminal for purposes of explanation is shown having six wheels. The number of wheels which may be used is optional and for example with the use of eleven wheels there may be provided two billion code combinations.

Referring now to the tubular key 26 above indicated, this key has a tubular handle portion 26a and an operating portion 26b which is reduced transversely to be generally semi-cylindrical in cross section which in operation is entered into the aperture 25e and disposed into the passage 25f formed by the alignment of the bores of said wheels and washers. With the wheels being in their non-operating position having their respective projections 27b–32b engaging the side wall 25c, the projections have freedom of movement through the space 25b below said bore 25. With the operating portion of the key being semi-cylindrical, it is seen that all of the wheels would rotate to the same extent. The key is adapted to rotate each wheel to a different precise extent and this is how the code is created.

In viewing said key as seen in FIGS. 4 and 5, an intermediate length 26c of the operating portion 26b of said key is segmented as shown in FIGS. 8–12, with angular segments as shown corresponding to their respective aligned wheels. Each segment is of a specific angular extent whereby each of the six wheels, in the present embodiment, is respectively rotated to the angular extent of its corresponding angular segment. The pattern of movement of said wheels gives rise to a code which has been indicated and will be further described. The wheel 27 does not have a corresponding segment in the key as it is rotated its full semi-cylindrical extent to alert a timer, not shown, in the computer 12 that the key is operative.

Said key is adapted to provide angular segments to rotate the wheels 28–32, said segments being 28c–32c and merely for purpose of illustration, a code is here indicated as shown on the screen 12a of the computer in FIG. 1 as 012321 and the correspondence of the segments in the key will be noted in FIG. 5.

With the insertion of the key 26 into the terminal 16, the wheels are respectively rotated and the notches and lands described in the wheels are passed through the light stream flowing through the fiber optic lines described interrupting said light stream to transmit the code described to be transmitted to the counter 18. Each wheel will have its notches and lands interrupt the light stream passing thereover for a length of time dependent upon the extent to which it is moved in accordance with its angular segment.

As soon as key 26 is inserted into the terminal it interrupts a stream of light which is otherwise constant passing from a light source 35a running from the power source 17b and passing said light to a receptor 35b which is also in circuit with the disk block 17b and the cutting off of the light triggers the circuit thus formed to have the disk block transmit a signal to a chip in the computer to start a timer to allow a predetermined length of time, such as 5–7 seconds, to operate the terminal prior to giving an appropriate alarm and/or shutting off the current to the terminal closing it down.

However with the key 26 being operative, the rotation by the key of the wheel 27 will alert the timer that a proper entry is being made. The rotation of the key will operate the code as has been described and said code is transmitted to the counter 18 by operation of the described fiber optic circuitry. The light code is read by the counter and converted into corresponding electrical impulses to be transmitted to said computer wherein said code will be read to make operational the intended program bearing the same code for the operation of the intended purpose. Transmission is through the conduit 13.

There is no limit to the functions which may be programmed and put into operation through the terminal which is a small piece of equipment and may be a cube of one inch capable of having two billion combinations. The terminal is essentially the invention herein with its directly related parts and the reference to the coded programs in the computer is a direct resulting operation of the terminal.

It will of course be understood that various changes may be made in the form, details, arrangement and proportions of the parts without departing from the scope of the invention herein, which, generally stated, consists in a device capable of carrying out the objects above set forth, in the parts and combination of parts disclosed and defined in the appended claims.

What is claimed is:

1. A multi-light code operated security lock, having in combination a terminal, an axial bore in said terminal, having a reduced extension thereof through a front wall of said terminal, a plurality of wheels disposed within said bore for axial rotation therein, means shielding said wheels to be light proof from one another, said wheels each having a semi-circular axial bore, the same extending through said shielding means, a key disposable into said semi-circular bore adapted to rotate said wheels, said terminal having opposed aligned spaced paired sets of bores, a light source in connection with said terminal, means transmitting light from said source to one set of said paired set of bores, said light passing directly through each bore of said one set and passing to and through the corresponding bores of said other aligned set thereof through the space therebetween, said wheels respectively being in alignment with said bores with each wheel having a peripheral portion thereof pass through said space between the aligned of said respective bores, each of said wheels having one or more notches and lands formed in its periphery, said notches and lands represent elements of a secret code, said notches being non-reflective and with said lands interrupt the light passing thereover between the aligned of said bores, said interruptions corresponding to and representing said code, a counter in communication with the other opposed set of said bores receiving the passage of light from each bore of said other opposed set of bores, said light having passed over said wheels and having been interrupted by said notches and said lands in said passage, said key having a series of angular segments removed therefrom respectively aligned with said wheels whereby rotation of said key rotates corresponding wheels according to the extent of the angular segments for such wheels whereupon said notches and lands in said wheels will be caused to interrupt said passage of light accordingly to manifest the code read by said counter, said counter being adapted to receive and read said light interruptions as a code and convert the same into corresponding electrical impulses, a computer, said counter being in circuit with said computer transmitting said impulses thereto, and said computer being provided with a chip receiving said impulses and making operational a program specified by said code.

2. The structure of claim 1, wherein said means shielding said wheels to be light proof from one another comprising spacers between said wheels being particularly adapted to prevent the passage of light from one wheel to another.

3. The structure of claim 1, wherein said means transmitting light from the source thereof comprising a fiber optic cable having a fiber optic line conducting light to each of one set of said paired sets of bores, and said light passing through to the respective bores of the other of said sets of bores.

4. The structure of claim 1, including a light means across the inner end of said axial bore of said terminal, said light means being interrupted by a key extending into said bore, said light means being in circuit with an alarm, and said interrupted light setting off said alarm subject to a period of time in which to operate said key in said terminal.

5. A multi-light code security lock, having in combination a terminal having an axial bore, therein and extending through a front wall thereof, a plurality of wheels disposed within said bore for axial rotation therein, means shielding said wheels to be light proof one from the other, said wheels having an axial bore extending therethrough, a key disposed into said axial bore of said wheels adapted to rotate said wheels, a light source in connection with said terminal, said terminal having spaced opposed aligned paired sets of bores, said sets of bores respectively being in alignment with said wheels, means transmitting light from said light source to the individual bores of one set of said opposed bores and said light passing therethrough to the corresponding individual bores of the other set of said opposed bores through the space therebetween, each of said wheels having light interrupting means formed in its periphery, said light interrupting means being adapted to form a secret code, said wheels respectively having a peripheral portion of each one pass through the space between the aligned opposed of said bores, said key rotating said wheels to respectively interrupt said light passing thereover to manifest the secret code, a counter receiving said light from said other opposed set of bores and reading the code made manifest by the interruptions in the passage of said light and converting said code into corresponding electrical impulses, and said counter transmitting said electrical impulses to a receiver adapted to recognize said code and make operational a program identified by said code.

6. A multi-light code security lock, having in combination a terminal having an axial bore therein, the same extending through said terminal's front wall, a plurality of wheels disposed within said bore for axial rotation therein, means shielding said wheels to be light proof one from the other, said wheels having a semi-circular axial bore extending therethrough, a key disposed into said semi-circular bore adapted to rotate said wheels, a light source in connection with said terminal, said terminal having spaced opposed aligned paired sets of bores, said wheels respectively being in alignment with said bores, means transmitting light from said light source to the individual bores of one set of said opposed bores and said light passing therethrough to the corresponding individual bores of the other set of said opposed aligned bores through the space therebetween, said wheels each have a peripheral portion thereof passing through said space between the aligned of said respective bores, each of said wheels having one or more notches and lands formed in its periphery, said notches and lands represent elements of a secret code, said key having angular segments removed therefrom respectively aligned with said wheels whereby said key in operating position rotates each of said wheels according to the extent of the angular segments for such respective wheels whereby said notches and lands in each of said wheels will be positioned to be caused to interrupt the passage of light over each of said wheels in a predetermined sequence to make manifest the code, a counter in communication with the other set of opposed bores receiving passage of light from the individual of said bores, said light having been interrupted in its passage between said bores, said counter being particularly adapted to receive and read the code of light interruptions and convert the same into corresponding electrical impulses, said counter being in circuit with a computer, whereby said impulses are transmitted to said computer, the same having a chip therein adapted to read the code of said electrical impulses and communicate it to a program in said computer identified by said code to make the program operational.

7. A multi-light code operational security lock, having in combination a terminal having an axial bore therein, a plurality of wheels disposed within said bore for rotation therein, means shielding said wheels to be light proof from one another, said wheels having a semi-circular axial bore therethrough, a key disposable into said bore, said terminal having opposed aligned spaced paired sets of bores, a light source in connection with said terminal, a fiber optic cable having fiber optic lines running from said light source to the respective bores of one of said sets of bores, a counter, a fiber optic cable from said counter having a fiber optic line in connection with each bore of said other set of opposed bores, said wheels respectively being in alignment with the opposed spaced pairs of said bores, said wheels each having a peripheral portion pass through said aligned space between opposed pairs of said bores, each of said wheels save one having a peripheral portion thereof to interrupt the light passing thereover between said opposed pairs of said bores, said light interrupted by peripheral portions of said wheels being adapted to form a secret code, said code being adapted to make operational a program responding to said code, said counter receiving said interrupted light passing through said other opposed set of bores and being adapted to read and convert the same into corresponding electrical impulses, a computer, means placing said counter in circuit with said computer, coded programs carried by said computer, said counter transmitting to said computer said secret code in electrical impulses, and means in said computer activated by said transmitted code activating and making operational a program responsive to said code.

* * * * *